(12) United States Patent
Lin et al.

(10) Patent No.: US 9,358,954 B2
(45) Date of Patent: Jun. 7, 2016

(54) SYSTEM AND METHOD FOR FINDING VEHICLE

(71) Applicant: HON HAI PRECISION INDUSTRY CO., LTD., New Taipei (TW)

(72) Inventors: Mao-Yu Lin, New Taipei (TW); Wei-An Chen, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/525,814

(22) Filed: Oct. 28, 2014

(65) Prior Publication Data

US 2016/0033636 A1 Feb. 4, 2016

(30) Foreign Application Priority Data

Jul. 30, 2014 (TW) .............................. 103125932 A

(51) Int. Cl.
*B60R 25/24* (2013.01)
*B62D 15/02* (2006.01)
*B60W 30/06* (2006.01)
*G01S 5/00* (2006.01)
*G07C 9/00* (2006.01)
*G01S 13/75* (2006.01)
*G05D 1/02* (2006.01)

(52) U.S. Cl.
CPC ................ *B60R 25/24* (2013.01); *B60W 30/06* (2013.01); *B62D 15/0285* (2013.01); *G01S 5/0072* (2013.01); *G01S 13/758* (2013.01); *G07C 9/00309* (2013.01); *G05D 1/024* (2013.01)

(58) Field of Classification Search
CPC .. B60R 1/12; B60R 11/0217; B60R 11/0247; B60R 11/02; B60R 11/0241; B60R 25/24; B60R 2325/101; B60R 2325/205; G06Q 20/341; G05D 1/0011; G05D 1/024; G05D 1/0246; A61M 5/20; G05B 19/00; G01C 15/04; G07C 1/32; G07C 9/0015; G07C 9/00309; G07C 9/00817; G01S 13/758; G01S 5/0072; G01S 1/66; G01S 5/12; G01S 11/06; B62D 15/0285; B60W 30/06
USPC ......... 340/424.5, 693.5, 5.2, 5.23, 5.25, 5.61, 340/5.73, 5.6, 815.4, 5.62; 342/28; 701/28, 701/300
See application file for complete search history.

(56) References Cited

U.S. PATENT DOCUMENTS

| | | | | |
|---|---|---|---|---|
| 6,420,975 B1* | 7/2002 | DeLine | ..................... | B60R 1/12 340/425.5 |
| 6,906,632 B2* | 6/2005 | DeLine | ..................... | B60R 1/12 340/425.5 |
| 8,232,897 B2* | 7/2012 | Tieman | ..................... | G01S 1/66 340/990 |
| 8,589,014 B2* | 11/2013 | Fairfield | ................. | G05D 1/024 701/28 |
| 8,847,731 B2* | 9/2014 | Tieman | ................... | B60R 25/24 340/425.5 |
| 2009/0264082 A1 | 10/2009 | Tieman et al. | | |

(Continued)

*Primary Examiner* — Ali Neyzari
(74) *Attorney, Agent, or Firm* — Novak Druce Connolly Bove + Quigg LLP

(57) ABSTRACT

A system for finding a vehicle includes a function controller, a key for matching with and controlling the function controller, and a portable device. The portable device can match with the key and transmit an instruction to the key. The key includes a first positioning module, and the function controller includes a second positioning module coupled to the first positioning module. The first positioning module and the second positioning module can receive data as to the distance between and respective locations of the chip key and the function controller. The present disclosure also discloses a method for finding vehicle.

16 Claims, 2 Drawing Sheets

(56) References Cited

U.S. PATENT DOCUMENTS

| | | |
|---|---|---|
| 2011/0257817 A1 | 10/2011 | Tieman |
| 2011/0267222 A1* | 11/2011 | Craig ................... G01S 13/878 342/25 B |
| 2012/0310466 A1 | 12/2012 | Fairfield et al. |
| 2014/0022051 A1* | 1/2014 | Levien ................... A61M 5/20 340/5.2 |

* cited by examiner

SYSTEM AND METHOD FOR FINDING VEHICLE

FIELD

The subject matter herein generally relates to wireless communication.

BACKGROUND

Searching for a parked automobile, whether in a large parking lot or in a parking garage, is a commonplace event in cities and suburban areas. Searchers often may wander about for some time until they spot the vehicle. This practice is usually frustrating, and depending on the time of day and the location, may even be dangerous. Therefore, most people try to come up with some way of remembering and identifying exactly where an automobile was parked. Further, many of the automobiles and SUV's in today's parking lots look alike, which exacerbates the difficulties of a straight forward sighting.

A number of devices have become available, offering a solution to this common daily problem. These include various projections that are fastened to the tops of automobiles, and which may light up or emit a sound upon receiving a radioed activating signal.

BRIEF DESCRIPTION OF THE DRAWINGS

Implementations of the present technology will now be described, by way of example only, with reference to the attached figures.

DETAILED DESCRIPTION

Figure 1:
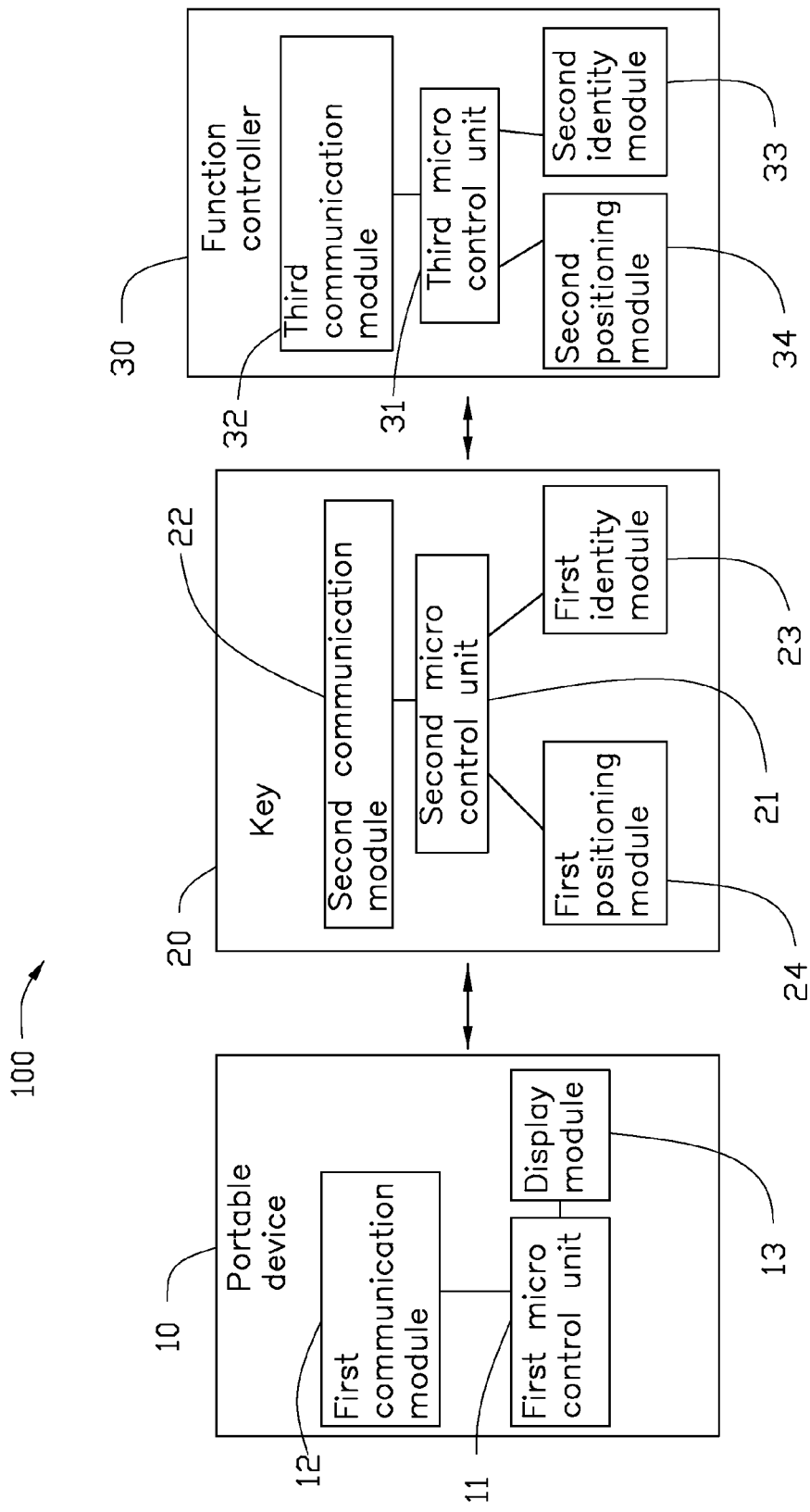
FIG. 1 is a block diagram of an embodiment of a system for finding a vehicle.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising", when utilized, means "including, but not necessarily limited to"; it specifically indicates open-ended inclusion or membership in the so-described combination, group, series, and the like.

The present disclosure describes a system and a method for finding vehicle.

FIG. 1 illustrates an embodiment of a system 100 for finding a vehicle. The system 100 can include a portable device 10, a key 20, and a function controller 30.

The portable device 10 can transmit an instruction and a first identification code to the key 20. The portable device 10 can include a first micro control unit (MCU) 11, and a first communication module 12 is electrically connected to the first micro control unit 11. The first micro control unit 11 can provide memory and operative functions for the portable device 10. The first communication module 12 can be configured to broadcast the instruction and the first identification code by radio, and the first communication module 12 can be controlled by the first micro control unit 11.

In at least one embodiment, the portable device 10 can include a plurality of micro control units and a plurality of communication modules. In operation, the portable device 10 can include software application (APP), and the application can be configured to drive the portable device 10.

The portable device 10 also include a display module 13 electrically connected to the first micro control unit 11. The display module 13 can have a screen, and the instruction which is broadcast can be shown to a user on the screen. In at least one embodiment, the screen can be a touch screen, and the instruction can be inputted into the portable device 10 via the touch screen.

The key 20 can be wirelessly connected to the portable device 10 and the function controller 30. The key 20 can include a second micro control unit 21, and a second communication module 22 electrically connected to the second micro control unit 21. The second micro control unit 21 can provide memory and operative functions for the key 20. In operation, the second communication module 22 can be wirelessly connected to the first communication module 12 by 2nd-Generation wireless telephone technology (2G), 3rd-generation (3G), 4th-Generation mobile communication (4G), BLUETOOTH, Wireless-Fidelity (WI-FI), or the like. In other embodiments, the key 20 can include a plurality of micro control units and a plurality of communication modules.

The key 20 also includes a first identity module 23 electrically connected to the second micro control unit 21. The first identity module 23 can identify the first identification code emitted by the portable device 10. When the first identification code is validated, the key 20 can match with the portable device 10. Otherwise, the key 20 cannot match with the portable device 10. After the key 20 is paired with the portable device 10, the second communication module 22 can transmit a second identification code and the instruction to the function controller 30. The key 20 can be received in the portable device 10.

In operation, the second communication module 22 can receive the first identification code emitted by the first communication module 12, the first identification code can be transmitted to the second micro control unit 21, then to be entered into the first identity module 23.

The key 20 further includes a first positioning module 24 electrically connected to the second micro control unit 21. The first positioning module 24 can be configured to receive a coded signal emitted by the function controller 30, and establish a signal strength and a direction of coded signal. In the illustrated embodiment, the first positioning module 24 can include an antenna member configured to receive the coded signal. The first positioning module 24 can also include some auxiliary equipment, such as electronic compass, gyroscope, and/or accelerometer. The first positioning module 24 can measure the distance and location between the chip key 20 and the function controller 30, by the antenna member and the auxiliary equipment.

After the first positioning module 24 receives data regarding the distance between and respective locations of the chip key 20 and the function controller 30, and the first positioning module 24 can transmit the data to the first communication module 12. Then the data can be displayed on the screen of the display module 13, thereby a searcher can easily find the vehicle by looking at the screen.

The function controller 30 can include a third micro control unit 31, a third communication module 32, and a second identity module 33. The third communication module 32 and the second identity module 33 can be electrically connected to the third micro control unit 31. The third micro control unit 31 can provide memory and operative functions for the function controller 30. In at least one embodiment, the function controller 30 can include a plurality of micro control units and a plurality of communication modules.

The third communication module 32 can be wirelessly connected to the second communication module 22, and can be configured to broadcast the second identification code and the instruction. In operation, the function controller 30 can also include a passive keyless entry (PKE) system or a remote keyless entry (RKE) system, which can add intelligence to the system 100.

The second identity module 33 can be similar to the first identity module 23. In operation, the third communication module 32 can receive the second identification code emitted by the second communication module 22, and the second identification code can be transmitted to third micro control unit 31 to be entered into the second identity module 33.

The function controller 30 further includes a second positioning module 34 coupled to the first positioning module 24, and the second positioning module 34 can be electrically connected to the third micro control unit 31. In operation, the second positioning module 34 can be configured to generate the coded signal. The first positioning module 24 can be configured to receive the coded signal, and receive data regarding the distance between and respective locations of the chip key 20 and the function controller 30, according to the signal strength and the direction of coded signal.

In at least one embodiment, the function controller 30 can further take control of an engine, a door lock, and other working parts of a vehicle. The portable device 10 can be a mobile phone, a notebook computer, or a tablet personal computer (Tablet PC).

Figure 2:
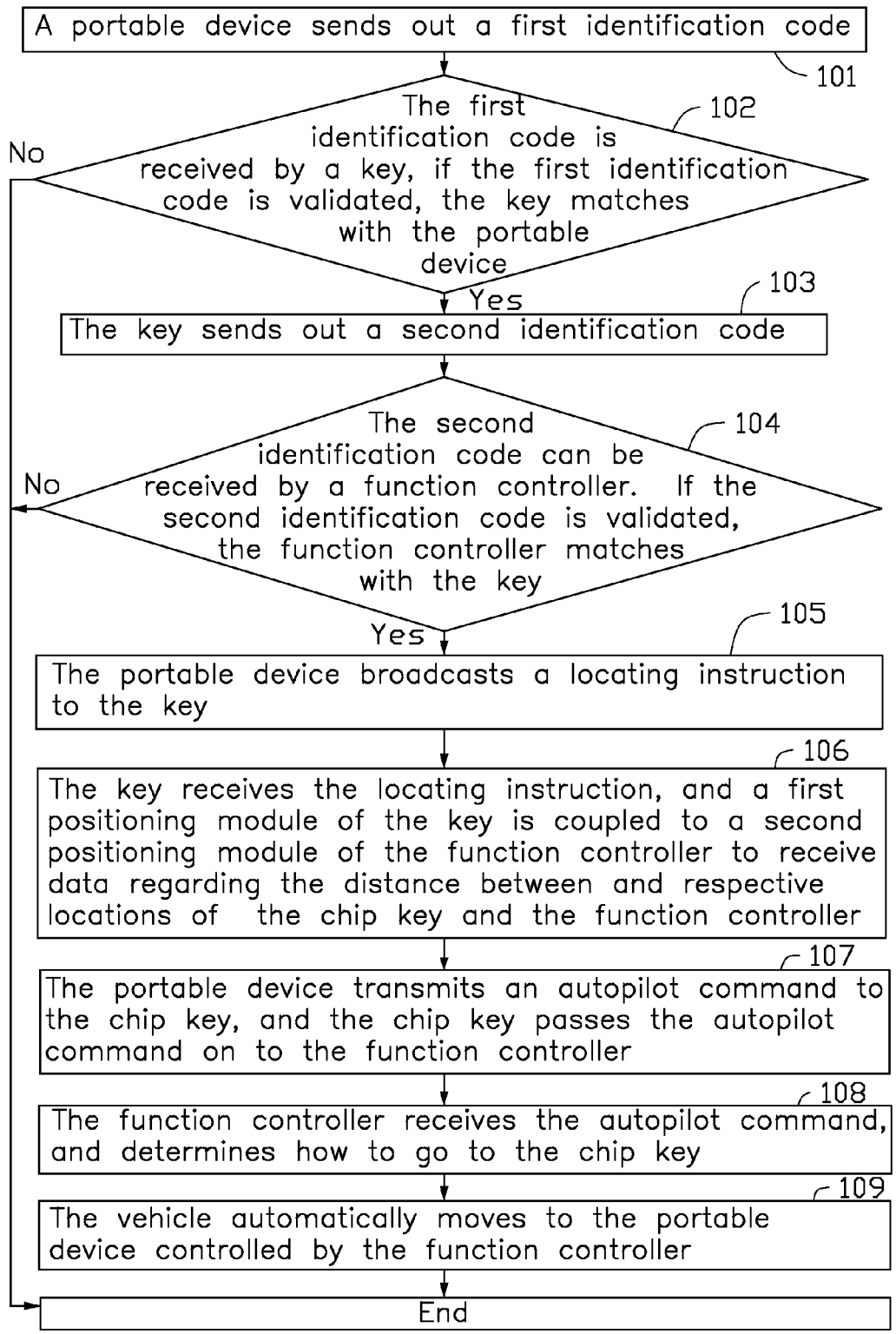
FIG. 2 is a flow diagram for a method of the system for finding a vehicle.

FIG. 2 illustrates a method for finding parked vehicle, which can include the following.

In block 101, the portable device 10 can send out a first identification code.

In block 102, the first identification code can be received by the key 20, if the first identification code is validated, the key 20 can match with the portable device 10.

In block 103, the key 20 can send out a second identification code.

In block 104, the second identification code can be received by the function controller 30. If the second identification code is validated, the function controller 30 can match with the key 20.

In block 105, the portable device 10 can broadcast a locating instruction to the key 20.

In block 106, the key 20 can receive the locating instruction, and a first positioning module 24 of the key 20 can be coupled to the second positioning module 34 of the function controller 30 to receive data regarding the distance between respective locations of the chip key 20 and the function controller 30.

In block 107, the portable device 10 can transmit an autopilot command to the chip key 20, and the chip key 20 can pass the autopilot command on to the function controller 30.

In block 108, the function controller 30 can receive the autopilot command, and determine a route to the chip key 20.

In block 109, the portable device 10 can confirm the execution of the autopilot command to the function controller 30, and the vehicle can automatically move to the portable device 10.

The system 100 requires a pairing process to happen twice. Firstly, the portable device 10 must pair for matching with the key 20 and secondly, the key 20 must pair for matching with the function controller 30. Control of the system 100 can only be achieved if the two pairing processes take place, so safety and security of the vehicle can be improved.

The embodiments shown and described above are only examples. Many details are often found in the art such as the other features of a system and method for finding vehicle. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A system for finding a vehicle, the system comprising:
   a function controller, and
   a key configured to match with and control the function controller,
   wherein the key includes a first positioning module;
   the function controller includes a second positioning module coupled to the first positioning module;
   the first positioning module and the second positioning module are configured to receive data regarding the distance between the key and the function controller and the relative position of the key and the function controller; and
   a portable device is configured to match with the key and transmit an instruction to the key.

2. The system for finding a vehicle as claimed in claim 1, wherein the data is shown in the portable device, and the vehicle can be found according to the data.

3. The system for finding a vehicle as claimed in claim 1, the function controller determines how to go to the key according the data.

4. The system for finding a vehicle as claimed in claim 1, the function controller is configured to control the vehicle automatically moving to the portable device.

5. The system for finding a vehicle as claimed in claim 1, the second positioning module generates a coded signal, the first positioning module includes an antenna member configured to receive the coded signal, and the first positioning module measures the distance and location between the key and the function controller, by the antenna member and some auxiliary equipments.

6. The system for finding a vehicle as claimed in claim 1, the portable device include a first micro control unit, and a first communication module electrically connected to the first micro control unit.

7. The system for finding a vehicle as claimed in claim 6, wherein the first communication module broadcasts the instruction and a first identification code to the key by radio.

8. The system for finding a vehicle as claimed in claim 7, wherein the key further include a first identity module configured to identify the first identification code emitted by the first communication module.

9. The system for finding a vehicle as claimed in claim 7, wherein the portable device include a display module electrically connected to the first micro control unit.

10. The system for finding a vehicle as claimed in claim 9, wherein and the display module includes a screen configured to show the instruction and the first identification code.

11. The system for finding a vehicle as claimed in claim 6, wherein the key further includes a second micro control unit, and a second communication module electrically connected to the second micro control unit.

12. The system for finding a vehicle as claimed in claim 11, wherein the second communication module sends out a second identification code and the instruction to the function controller.

13. The system for finding a vehicle as claimed in claim 12, wherein the function controller further includes a second identity module configured to identify the second identification code emitted by the key.

14. The system for finding a vehicle as claimed in claim 6, wherein the function controller further includes a third micro control unit, and a third communication module electrically connected to the third micro control unit.

15. The system for finding a vehicle as claimed in claim 1, wherein the key is received in the portable device.

16. A method for finding a vehicle, comprising:
a portable device sends out a first identification code;
the first identification code is received by a key, if the first identification code is validated, the key matches with the portable device;
the key sends out a second identification code;
the second identification code can be received by a function controller, if the second identification code is validated, the function controller matches with the key;
the portable device broadcasts a locating instruction to the key;
the key receives the locating instruction, and a first positioning module of the key is coupled to a second positioning module of the function controller to receive data regarding the distance between the key and the function controller and the relative position of the key and the function controller;
the portable device transmits an autopilot command to the chip key, and the chip key passes the autopilot command on to the function controller;
the function controller receives the autopilot command, and determines how to go to the chip key; and
the vehicle automatically moves to the portable device controlled by the function controller.

* * * * *